United States Patent [19]
Wienhold et al.

[11] Patent Number: 5,823,100
[45] Date of Patent: Oct. 20, 1998

[54] BAKING/COOLING RACK

[75] Inventors: James L. Wienhold, St. Louis Park; Irene C. Kramer, St. Paul, both of Minn.

[73] Assignee: L & L Products, West St. Paul, Minn.

[21] Appl. No.: 53,934

[22] Filed: Apr. 2, 1998

[51] Int. Cl.⁶ .............................. A47J 37/04; A47J 37/12; A47J 43/00; A47J 43/18
[52] U.S. Cl. ............................... 99/449; 99/426; 99/450; 108/91; 126/9 R; 126/337 R; 211/181.1; 248/94; 248/172
[58] Field of Search ............................ 99/426, 448, 449, 99/450, 410–417; 108/91, 137, 163, 176, 179, 102; 126/9 R, 25 R, 25 A, 9 A, 9 B, 337 R, 29, 332; 211/181.1, 189, 153, 175, 182, 188, 194, 133.2, 134; 220/485, 486, 489, 743, 746, 912; 248/94, 172; 206/511–513; D6/462–464, 458; D7/332, 708

[56] References Cited

U.S. PATENT DOCUMENTS

| | | | |
|---|---|---|---|
| D. 206,549 | 12/1966 | Callender | D44/29 |
| D. 232,340 | 8/1974 | Lax | D7/71 |
| D. 278,196 | 4/1985 | Koves | D6/465 |
| D. 290,970 | 7/1987 | Rich | D18/23 |
| D. 319,356 | 8/1991 | Vukelich, Sr. | D6/462 |
| D. 329,954 | 10/1992 | Sharon et al. | D6/462 |
| D. 334,307 | 3/1993 | Lee | D6/462 |
| D. 334,854 | 4/1993 | Pestone | D6/458 |
| D. 364,288 | 11/1995 | Kramer et al. | D6/465 |
| 719,441 | 2/1903 | Davison | 108/163 |
| 1,499,665 | 7/1924 | Kaufman . | |
| 1,946,711 | 2/1934 | Quisenberry | 211/181.1 |
| 2,240,367 | 4/1941 | Fernholtz . | |
| 2,676,712 | 4/1954 | Chappory | 108/32 X |
| 2,749,071 | 6/1956 | Remstein | 248/172 |
| 3,487,951 | 1/1970 | Beltzung | 211/181.1 X |
| 3,858,835 | 1/1975 | Baren | 248/94 |
| 3,905,286 | 9/1975 | Le Grady | 99/450 |
| 3,998,170 | 12/1976 | Gordon | 108/91 |
| 4,109,567 | 8/1978 | Gage et al. | 99/450 |
| 4,178,844 | 12/1979 | Ward et al. | 99/449 |
| 4,191,160 | 3/1980 | Elliott | 211/181 |
| 4,782,813 | 11/1988 | Kopke | 126/25 |
| 4,848,217 | 7/1989 | Koziol | 99/426 |
| 5,035,335 | 7/1991 | Massoudnia | 211/188 |
| 5,103,799 | 4/1992 | Atanasio | 126/9 R |
| 5,638,742 | 6/1997 | Kassaseya | 99/426 |
| 5,638,809 | 6/1997 | Wienhold | 126/337 |
| 5,673,611 | 10/1997 | Tieman | 99/413 |

OTHER PUBLICATIONS

Stacking the Chips, People Weekly Magazine, p. 77, Oct. 3, 1994.

*Primary Examiner*—Timothy F. Simone
*Attorney, Agent, or Firm*—Kinney & Lange, P.A.

[57] ABSTRACT

A baking and/or cooling rack having at least two shelves formed of wire. The shelves are connected by wire support legs such as at the outside corners of the shelves. The connection between each shelf and its attached support legs is provided by a spring pin. The spring pins form hinges which provide a friction force preventing free movement of the connected support legs with respect to the shelves, but which allows forced movement of the connected support legs with respect to the shelves, thereby allowing the rack to fold between an upright position and a knocked down position. A third shelf may be removably supported by the support legs between the first and second shelves.

15 Claims, 4 Drawing Sheets

BAKING/COOLING RACK

BACKGROUND OF THE INVENTION

The present application relates to racks such as to support food items in baking and/or cooling of the food items during or after cooking in an oven. More particularly, the present invention relates to baking and/or cooling racks which fold between a first upright position for use and a second knocked down position for packaging, shipping and/or storage.

Baking and cooling racks have long been used to support food items both during cooking in an oven and after cooking when food items are removed from the oven for cooling. For instance, many conventional ovens include rack type shelves removably supported by protrusions on the inside surface of the oven. Cooling racks may be used to support food items such as above a horizontal counter surface. Some racks include shelf surfaces which can withstand the temperatures of the oven cooking but are more readily removable from the oven than the conventional oven shelves, for use in both cooking and cooling.

The racks typically consist of a number of parallel aligned wires which attach between cross bars or other wires to form a rigid planar surface. The wire construction is low cost and allows ample circulation of air among the food items. During baking, the circulation of air is beneficial for fast and uniform heating of the supported items. During cooling, the circulation of air is beneficial for uniform cooling of the items.

It is often desired to include more shelf surface than available with single racks, and many conventional ovens include multiple rack-type shelves supported one over the other. Cooling racks have also been designed with multiple shelves, thereby increasing the surface area available.

BRIEF SUMMARY OF THE INVENTION

The present invention is a baking and/or cooling rack having at least two shelves. The shelves are connected by support legs which are preferably at the outside corners of the shelves. The connection between each shelf and its attached support legs is provided by hinges which extend parallel to one another and within the planes of the first and second shelves. The hinges provide a friction force which prevents free movement of the connected support legs with respect to the shelves, but which allows forced movement of the connected support legs with respect to the shelves, thereby allowing the rack to fold between an upright position and a knocked down position.

Figure 1:
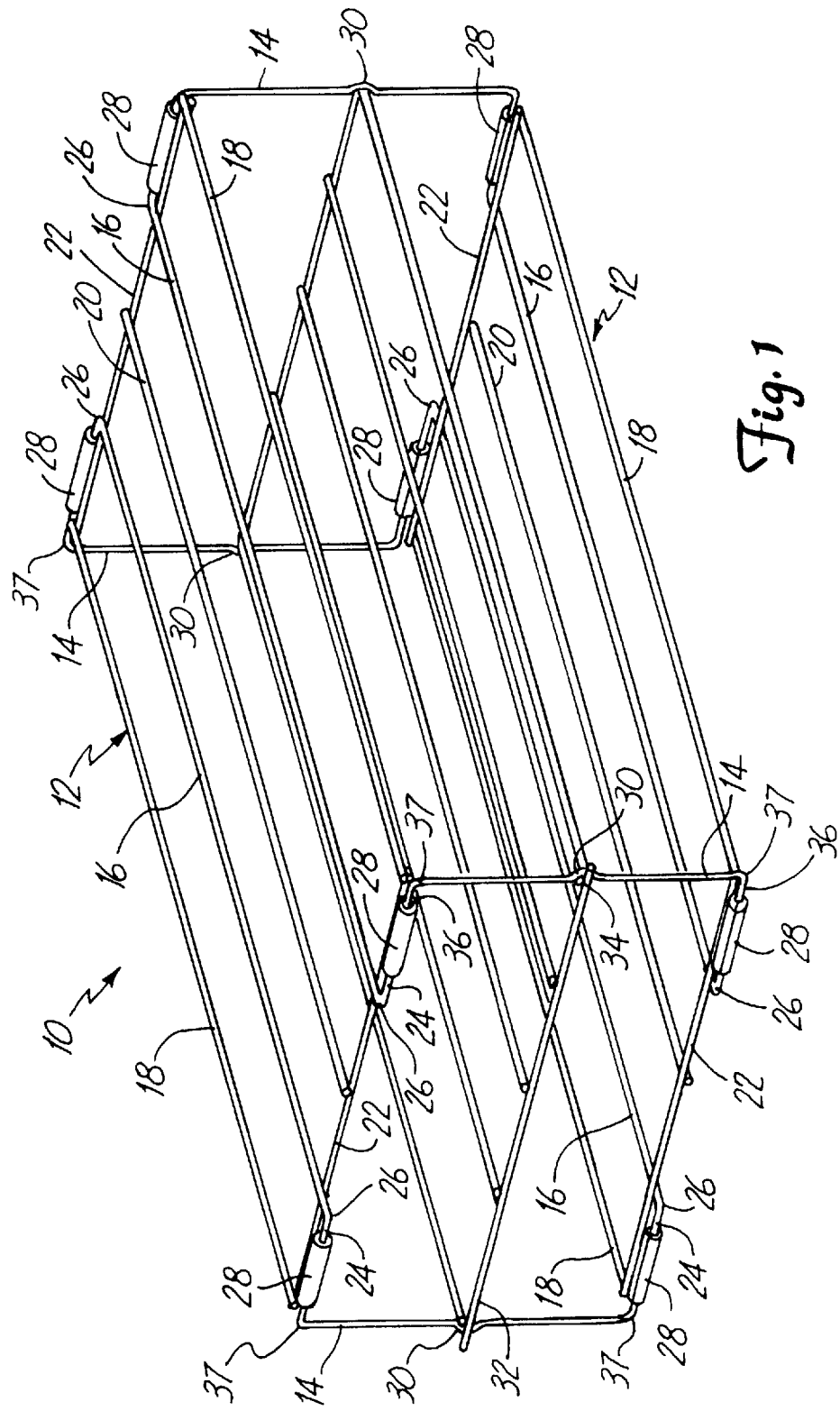
FIG. 1 is a perspective view of the rack according to the present invention.

While the above-identified drawing figures set forth a preferred embodiment, other embodiments of the present invention are also contemplated, some of which are noted in the discussion. In all cases, this disclosure presents embodiments of the present invention by way of representation and not limitation. Numerous other minor modifications and embodiments can be devised by those skilled in the art which fall within the scope and spirit of the principles of this invention.

DETAILED DESCRIPTION

The rack 10 of the present invention includes upper and lower shelves 12 connected by support legs 14. The upper shelf 12 and the lower shelf 12 may be constructed differently, but for ease of manufacturing are preferably identically constructed. Each shelf 12 preferably includes two inside wires 16 and two outside wires 18 running the length of the shelf 12. Depending upon the width desired for the shelves 12 and the desired spacing between wires 16, 18, the shelf 12 may include one or more additional central wires 20. Similarly, the shelf 12 may include additional wires (not shown) between the inside wires 16 and the outside wires 18.

The inside wires 16, the outside wires 18 and the central wire 20 are rigidly connected together by cross bars 22, thereby defining the surface of the shelf 12. For instance, the wires 16, 18, 20 may be attached to the cross bar 22 by welding. While the preferred embodiment includes two cross bars 22, one at each end of the shelf 12, additional intermediate cross bars (not shown) may be added for further strength.

In the preferred embodiment, the outside wires 18, the inside wires 16 (that is, at least the portion of inside wires 16 between the cross bars 22), and the central wire 10 are each straight wires running parallel to each other and perpendicular to the cross bars 22. Alternatively, one or all of the outside wires 18, the inside wires 16, the central wire(s) 20 and the cross bars 22 may be bent into a non-straight configuration. Even if bent, the outside wires 18, the inside wires 16, the central wire(s) 20 and the cross bars 22 preferably extend generally in the same plane, so as to together form a relatively flat surface. Alternatively, a portion of the shelf 12 may be bent outside the plane, so as to support food items at a different level. As another alternative, one or all of the outside wires 18, the inside wires 16 and the central wire(s) 20 may cross the cross bars 22 at a non-perpendicular angle.

The central wire 20 and the outside wires 18 each preferably terminate at the cross bar 22, and the cross bar 22 preferably terminates at the outside wires 18. Alternatively, one or both outside wires 18 could be formed out of the same piece of wire as one or both cross bars 22, with the single piece of wire bent into portions of the desired length and width for the shelf 12. In the preferred configuration shown, each of the inside wires 16, the outside wires 18 and the central wire 20 attach on the same side of the cross bar 22, and thus are disposed at the same height. With this configuration, flat items resting on the shelf 12 win make contact with all of the central, inside and outside wires 20, 16, 18. In the preferred configuration shown, the wires 16, 18, 20 attach on the bottom of the cross bar 22 on the bottom shelf 12 and on the top of the cross bar 22 on the top shelf 12, so the rack 10 is symmetrical about a horizontal bisecting plane, and the user can equally use the rack 10 with either side up. Alternatively, the rack 10 could be equivalently constructed with one or both shelves 12 flipped over relative to the horizontal bisecting plane.

The distance between the outside wires 18 and/or the length of the cross bars 22 defines a width of the shelves 12, which is in the preferred embodiment about 8¼ inches. The length of the outside wires 18 and/or the distance between the cross bars 22 defines a length of the shelves 12, which in the preferred embodiment is about 14 inches. Such 8¼×14 inch shelves 12 provide a sizable space for supporting food items, while at the same time remaining relatively lightweight (even with the weight of the supported food items) for mobility and small enough to easily fit on a conventional oven shelf (not shown).

The spacing between adjacent central 20, inside 16 and outside wires 18 is selected based on the desired air circulation and shelf strength, such as a preferred spacing uniformly selected at a value from about 1 to 2½ inches. Other spacings or non-uniform spacings may also be used.

The size (diameter or thickness) of the wire is selected based on the desired strength and rigidity and construction of the shelves 12. For instance, the wire may be provided by 8 gauge (5⁄32 inch outer diameter) standard cold rolled steel wire. The wire construction is low cost and allows ample circulation of air among the food items and through the plane of the shelves 12. Workers skilled in the art will appreciate that the first shelf 12 and/or the second shelf 12 could be constructed of alternative materials, such as providing a flat "cookie sheet" type of surface.

The inside wires 16 each have ends 24 which extend beyond the cross bar 22 and include a bend 26 immediately past the cross bar 22. The bend 26 is preferably a 90° turn so the ends 24 of the inside wires 16 run parallel to the cross bars 22 and parallel to each other.

The end 24 of each inside wire 16 attaches to a hinge 28. Because the hinges 28 attach to the ends 24 of the inside wires 16, the hinges 28 all extend in the plane of their respective shelf 12 and more importantly all in the same plane as each other. Because the ends 24 of the inside wires 16 are all parallel to each other, the hinges 28 all run parallel to each other.

The first and second shelves 12 are connected together through the hinges 28 by a plurality of the support legs 14, such as the four support legs 14 shown in the preferred embodiment. In the preferred embodiment, all of the support legs 14 are identically constructed. For instance, each support leg 14 may be formed of wire similar to the wires of the shelves 12. The length of the support legs 14 generally determines the spacing between the shelves 12, and the support legs 14 preferably all have the same length such as about 6 inches tall.

Figure 3:
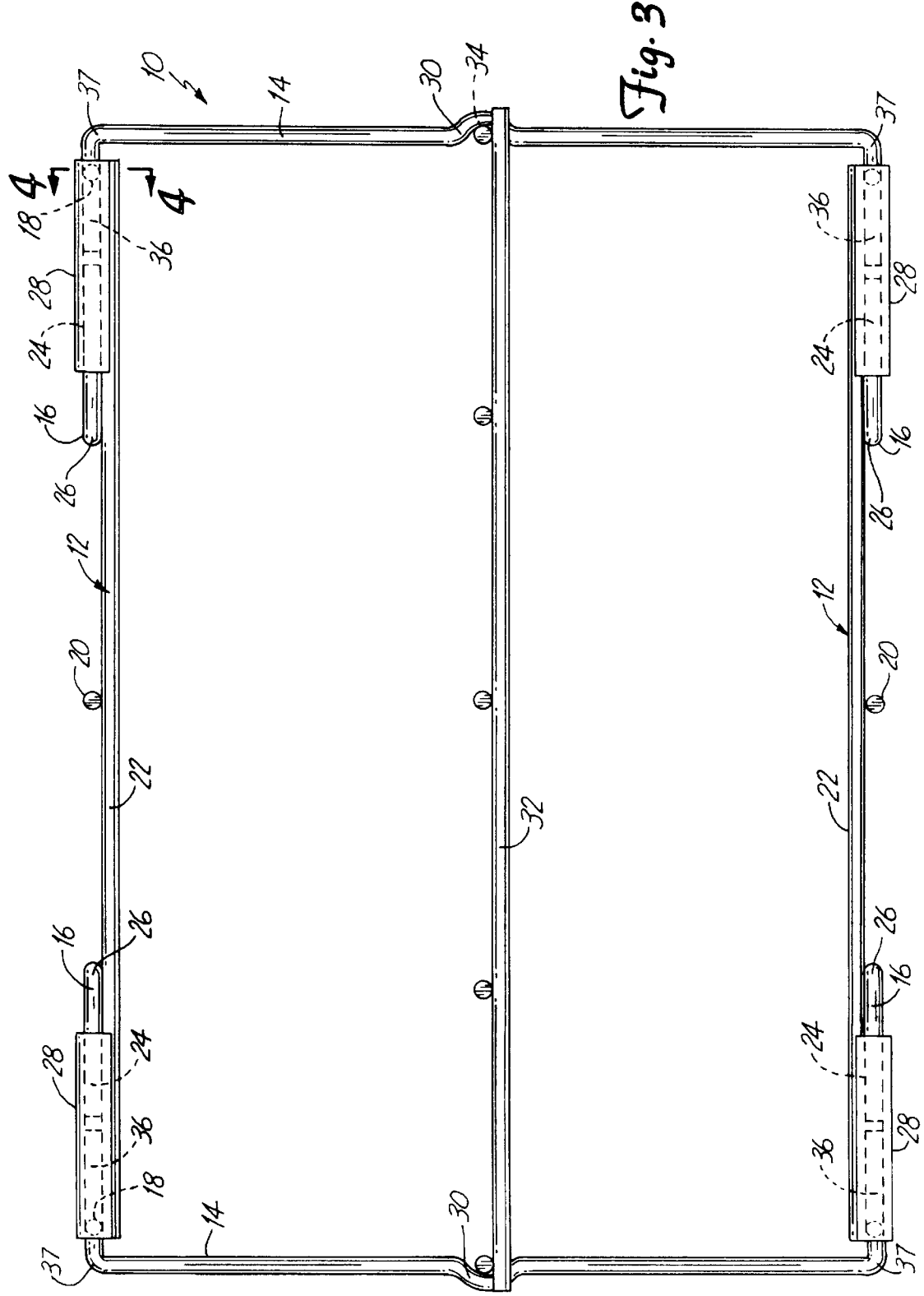
FIG. 3 is an end view of the rack of FIG. 1.

If desired, each of the support legs 14 may include one or more bends or notches 30 to support one or more intermediate shelves 32, shown in FIGS. 1 and 3. In the preferred embodiment, the intermediate shelf 32 has a width which is slightly greater than the width between the support legs 14. The intermediate shelf 32 thus rests in the notches 30.

The intermediate shelf 32 is not rigidly secured or hinged to the support legs 14, and thus is removable. A detent 34 may be included in one or more ends of the removable shelf 32. During insertion of the intermediate shelf 32 between the support legs 14, the detent 34 forces the support legs 14 slightly outward before allowing the support legs 14 to return to their spaced position. The detent 34 thus seats the intermediate shelf 32 in a removably attached position with regard to the support legs 14.

The support legs 14 preferably have bends 37 to form ends 36 which terminate in the hinges 28, providing a simple and efficient construction for assembly and use. Support legs 14 may alternatively be extended below the bottom shelf 12, to raise the bottom shelf 12 relative to the surface on which the rack 10 is placed. Support legs 14 may also alternatively be extended above the top shelf 12, to support yet additional shelves (not shown).

With the hinged connection, the support legs 14 can pivot with respect to the top and bottom shelves 12. The rack 10 is thus foldable from the extended position shown in FIG. 1 through the partially knocked down position shown in FIG. 2 to a completely knocked down position. The knocked down configuration can be used for packaging and shipping of the rack 10 in a reduced space, and for storage of the rack 10 in a reduced space.

By having the hinges 28 all extending parallel to each other, the shelves 12 can fold down without binding. As each of the wires has some degree of flexibility, precise parallel alignment between the ends 36 of the wires on the support legs 14 and the ends 24 of the inside wires 16 is not critical. Having the same length for all support legs 14 allows the first shelf 12 to stand and fold in a parallel relationship to the second shelf 12. That is, if the rack 10 is stood on a horizontal surface, both shelves 12 will be horizontal in the extended position and in the knocked down position and will remain horizontal during folding.

Figure 2:
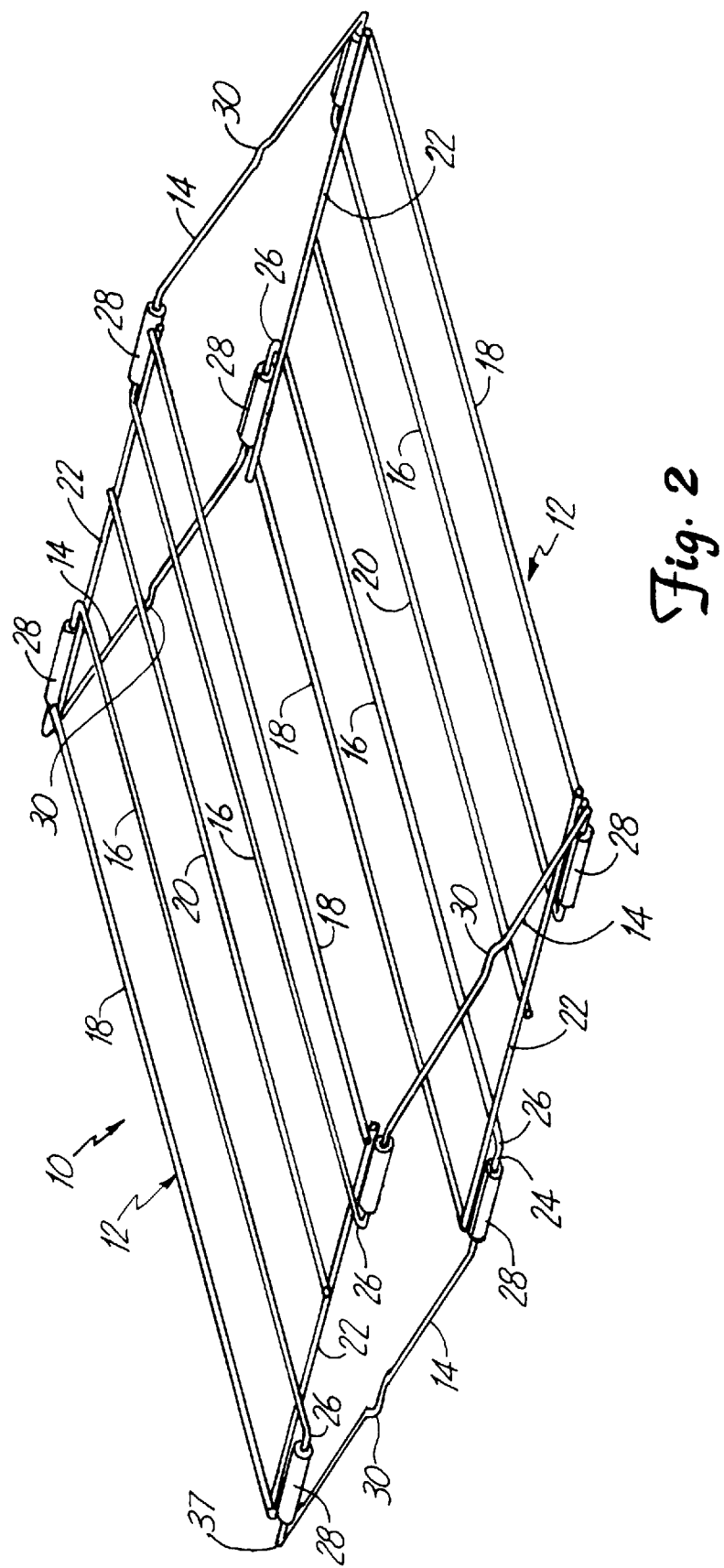
FIG. 2 is a perspective view of the rack of FIG. 1 in a partially folded position.

The rack 10 can be folded to a partially knocked down position with the intermediate shelf 32 in position. However, the complete folding to a fully knocked down position requires removal of the intermediate shelf 32 as shown in FIG. 2.

The support legs 14 are preferably positioned at the outside corners of the shelves 12. That is, the support legs 14 on opposing sides of the width of the shelves 12 are separated by a distance slightly greater than the width of the shelves 12, and the support legs 14 on opposing ends of the length of the shelves 12 are separated by a distance greater than the length of the outside wires 18. For instance, the support legs 14 may be spaced such as in corners of a 9×14½ inch rectangle. By having the support legs 14 so spaced at the outside corners, the support legs 14 do not contact on either the cross bar 22 or the outside wire 18 during folding of the rack 10. With the intermediate shelf 32 removed, the rack 10 can fold completely down until the cross bar 22 on the top shelf 12 contacts the wires 16, 18, 20 of the bottom shelf 12 and vice versa.

Workers skilled in the art will appreciate that the support legs 14 do not necessarily have to be at the outside corners of the rack 10. For instance, the support legs 14 can alternatively be spaced inward with respect to the width of the shelves 12, and have the hinges 28 run outward to hinge 28 the support legs 14 to the outside wires 18. Conversely, the support legs 14 can alternatively be spaced inward with respect to the length of the shelves 12, such as having the inside wires 16 not extend the full length of the rack 10.

The hinges 28 could alternatively attach to the cross bars 22 rather than to ends of the inside or outside wires 18. If the cross bars 22 are then moved inward from the ends of the shelves 12, the hinges 28 would similarly be spaced inward with respect to the length of the shelves 12.

The shelves 12, support legs 14 and hinges 28 may be finished or plated to provide a durable, attractive rack 10. For instance, all of the shelves 12, the support legs 14 and the hinges 28 may include a bright nickel chrome finish.

The hinges 28 of the present invention provide a collective resistance to set up and fold down. That is, the hinges 28 provide a collective friction force preventing free movement of the support legs 14 with respect to shelves 12, but allowing forced movement of the support legs 14 with respect to the shelves 12, thereby allowing the rack 10 to fold between an upright position and a knock down position. For instance, the preferred embodiment provides a set up/fold down resistance of about 10 to about 18 pounds. This hinge resistance must be maintainable through repeated set up and fold down cycling.

If the rack 10 is to be used in an oven, the hinge resistance must simultaneously be maintainable through repeated thermal cycling of the rack 10 from ambient conditions up to about 500° F. That is, the desired set up/fold down resistance must be maintained at about 10 to 18 pounds even when the hinges 28 undergo repeated use and repeated thermal cycling as the rack 10 is opened, used in the oven for cooking, allowed to cool, and closed. The rack 10 may also used in a refrigerator or freezer and thus should handle colder temperatures as well. If the set up/fold down resistance significantly decreases, the rack 10 will be susceptible to an undesired collapse upon loading with food items and/or handling of the rack 10. If the set up/fold down resistance significantly increases, a user may be unable to move the rack 10 between the desired upright and knocked down positions.

The preferred hinges 28 are provided by "spring pins", also known as press pins and tension pins. Spring pins are commerically used for a variety of purposes such as to attach gears onto shafts. The preferred spring pins 28 are properly dimensioned to receive the wires of the end 24 of the inside wires 16 and the ends 36 of the support legs 14, such as ¼ inch outer diameter×1½ inch length. The spring pins 28 may for instance be manufactured in accordance with MIL-P-10971, MS 171401–MS 171900 and/or SAE Std J 496, of 1070 carbon steel which has been harden and tempered to RC 46-53.

Figure 4:
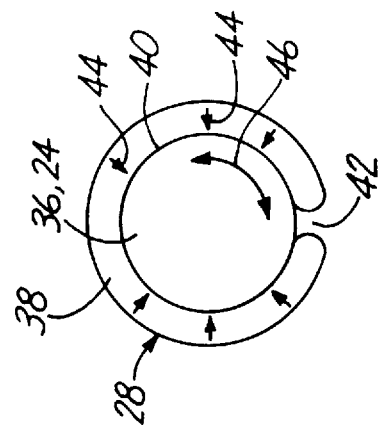
FIG. 4 is a cross-sectional view taken along line 4—4 from FIG. 3.
Figure 5:
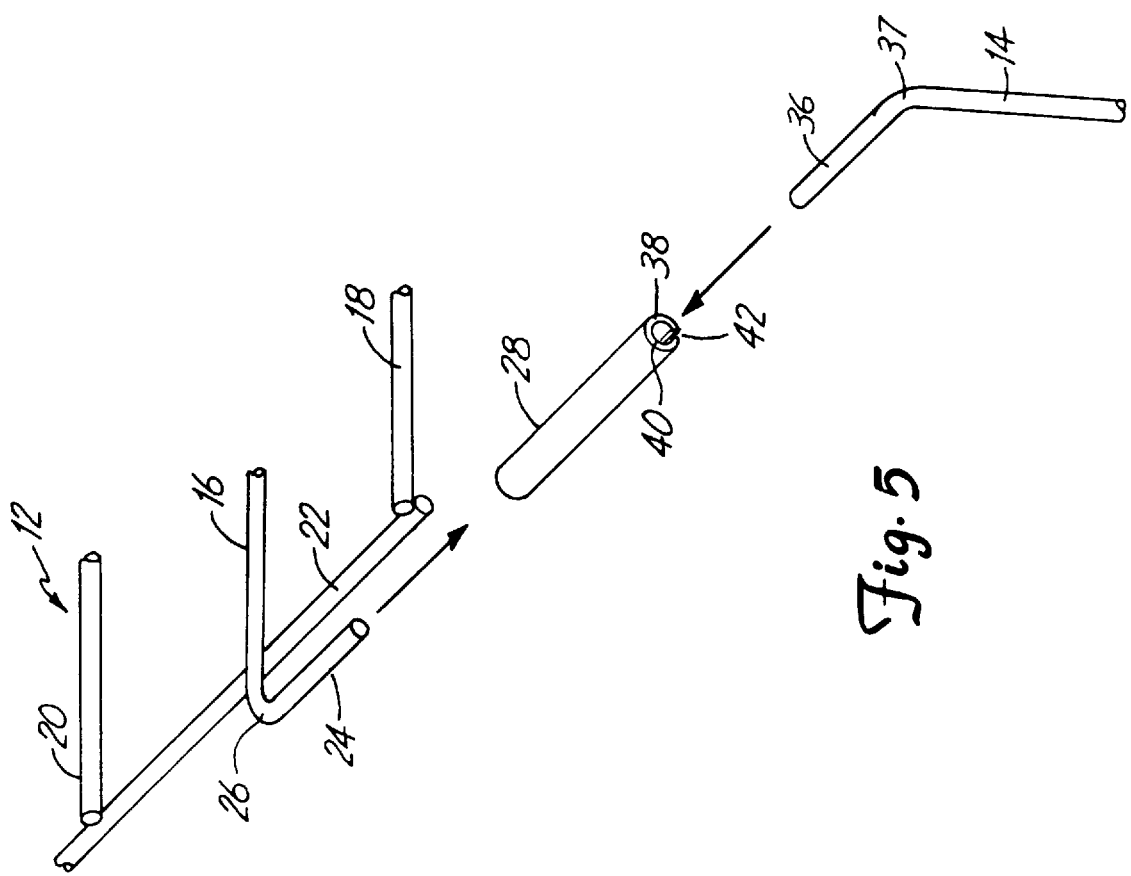
FIG. 5 is an exploded perspective view of the spring pin attachment of the present invention.

As best shown in FIGS. 4 and 5, the spring pins 28 include a sleeve 38 defining a central through-hole or lumen 40 with a longitudinally extending gap or opening 42. The longitudinally extending opening 42 allows the spring pin 28 radially expanded to receive a wire which has an outer diameter which is slightly greater than the unexpanded inner diameter of the spring pin 28. The end 24 of the inside wire 16 and the end 36 of the support leg 14 are received in the central lumen 40. Thus expanded by the wires 24, 36, the spring pin 28 places a compressive force on the wires 24, 36 in the radial direction shown by arrows 44. This compressive force acts as a normal force between the generally cylindrical outside surface of the wires 24, 36 and the inside surface of the spring pins 28. The normal force is controllable due to selection of the corresponding outer diameter of the wires 24, 36 and the diameter of the central lumen 40. The controllable normal force assures a consistent friction fit between the spring pins 28 and the wires 24, 36, during pivoting between the upright position and the knocked down position shown by arrow 46. The wire size and/or the plating thickness may be selected as necessary with respect to the size of the lumen 40 to provide the proper friction fit.

The longitudinally extending opening 42 makes the spring pin 28 easy to assemble to both the end 24 of the inside wire 16 and the end 36 of the support leg 14. The spring pin 28 is merely forced open by the ends 24, 36 of the wires 16, 14 or otherwise. The ends 24, 36 of the wires 16, 14 are then inserted to an appropriate depth, and the spring pin 28 is allowed to close. Because both the end 24 of the inside wire 16 and the end 36 of the support leg 14 have bends 26, 37 immediately next to the spring pin hinge 28, neither the inside wire 16 nor the support leg 14 can be inserted too far into the spring pin 28.

In the preferred embodiment, the wire of the support leg 14 is the same diameter as the inside wire 16 of the shelf 12. This allows the spring pin 28 to have a continuous inner diameter to the lumen 40 which does not change along the length of the spring pin 28. Alternatively, if it was desired to enlarge (such as for strengthening) one or the other of the support leg 14 or the shelf wire 16, the spring pin 28 could be formed with an inner diameter which is different on one side as opposed to the other. In any event, the inner diameter of the spring pin 28 should be sized to match the outer diameter of the associated wire which is attached to the spring pin 28 at that end of the spring pin 28, with the desired normal force.

In the preferred embodiment, no lubricant is placed between the hinge pin 28 and the wire ends 24, 36. If any lubricant is used, the lubricant must consistently allow the desired set up/fold down resistance. In particular, any lubricant used must not be volatile or evaporate under the temperatures and thermal cycling typically undergone by the rack 10.

With the spring pin structure, the compressive force is consistent and thus the friction force for each of the hinges 28 remains consistently present regardless of repeated use and/or repeated thermal cycling of the rack 10. Therefore, the collective 10 to 18 pounds set up/fold down resistance is maintained relatively constant during normal use of the rack 10. Testing of the preferred embodiment indicates that normal use including thermal cycling causes a slight increase in set up/fold down resistance. It is believed that this slight increase may be due to microscopic mating between the outside surface of the wire ends 24, 36 and the inside diameter surface of the sleeve 38 of the spring pin 28 during the heating cycle, i.e., smoothing of the respective mating surfaces caused by the normal force pressure under heat, thereby increasing the coefficient of friction between the respective mating surfaces. The increase in set up/fold down resistance may also be due to chemical changes in the surface layer of the wire and/or nickel chrome finish, such as any oxidation, or any driving off of any lubricant, water content or other substance in the surface layer caused by the thermal cycling.

Workers skilled in the art will appreciate that the spring pins 28 could be rigidly attached to one of either the ends 24 of the inside wires 16 or the ends 36 of the support legs 14, such as by forming a sleeve (not shown) on the end 24 or 36 of the wire 16 or 14. However, the spring pins 28 as described are commercially available at relatively low cost. Also, by having the spring pins 28 attached rigidly to neither the support legs 14 nor the shelves 12, the spring pins 28 are free to rotate with respect to either the support legs 14 or the shelves 12 during set up and knock down of the rack 10. With either of two surface interfaces providing the dynamic friction resistance to set up/fold down, the unfixed spring pin 28 further provides for a consistent set up/fold down force. In particular, binding between a spring pin 28 and either the attached support leg 14 or the attached shelf 12 will not be fatal to the hinge operation.

Although the present invention has been described with reference to preferred embodiments, workers skilled in the art will recognize that changes may be made in form and detail without departing from the spirit and scope of the invention.

We claim:

1. A rack comprising:
   a first shelf;
   a plurality of first shelf hinges connected to the first shelf, each of the first shelf hinges generally extending parallel to one another in a first hinge plane;
   a plurality of support legs spaced from each other, each of the support legs connected with one of the first shelf hinges to the first shelf; and a plurality of second shelf hinges, each of the second shelf hinges connected to one of the support legs, each of the second shelf hinges generally extending parallel to one another in a second hinge plane and parallel to the first shelf hinges;

a second shelf, the second shelf connected to each of the support legs with the second shelf hinges;

wherein the first shelf hinges and the second shelf hinges provide a friction force preventing free movement of the connected support legs with respect to the first shelf surface and the second shelf surface but allowing forced movement of the connected support legs with respect to the first shelf surface and the second shelf surface, thereby allowing the rack to move between an upright position and a knock down position.

2. The rack of claim 1, wherein each of the plurality of support legs are formed of wire, and wherein each of the first shelf and the second shelf are formed of wire.

3. The rack of claim 2, wherein each of the first shelf hinges and each of the second shelf hinges are formed of a sleeve sized to receive the wire of the support legs and the wire of the shelves with a friction fit.

4. The rack of claim 3, wherein each of the sleeves is a spring pin defining a central lumen and a longitudinally extending opening, the sleeves receiving the received wires in the central lumen, each lumen having unexpanded diameter which is smaller than an outer diameter of the received wires, such that each spring pin receives the received wires by expansion to place a radial compressive force on the corresponding wires.

5. The rack of claim 2, wherein each of the first shelf and the second shelf include a plurality of inside wires and a plurality of outside wires connected together by a plurality of crossbars, wherein the outside wires have a distance therebetween defining a width of the shelves, wherein the support legs on opposing sides of the width of the shelves are separated by a distance greater than the width of the shelves, and wherein each hinge runs from one of the inside wires to one of the support legs.

6. The rack of claim 5, wherein the outside wires have a length, wherein the support legs are on opposing ends of the length of the outside wires and are separated by a distance greater than the length of the outside wires.

7. The rack of claim 1, wherein each of the first shelf and the second shelf include a plurality of first wires connected together by a plurality of crossbars, wherein the first wires have ends which extend beyond the crossbars, wherein each hinge runs from the end of one of the first wires to one of the support legs, each of the ends including a bend and each of the support legs including bends such that each of the hinges run parallel to the crossbars.

8. The rack of claim 1, wherein all of the support legs have the same height, such that the first shelf and the second shelf are parallel during forced movement of the rack between the upright position and the knocked down position.

9. The rack of claim 1, further comprising:

a third shelf supported by the plurality of support legs in a parallel relationship with the first shelf and the second shelf.

10. The rack of claim 9, wherein each of the support legs includes a notch, wherein the third shelf is removably supported by the notches.

11. The rack of claim 10, wherein the third shelf includes a detent for removably securing the third shelf to the plurality of support legs.

12. A rack comprising:

a first shelf defining a first shelf plane, the first shelf including at least four generally cylindrical first shelf wire ends, each of the first shelf wire ends extending in a parallel relationship in the first shelf plane;

a second shelf defining a second shelf plane, the second shelf including at least four generally cylindrical second shelf wire ends, each of the second shelf wire ends extending in a parallel relationship in the second shelf plane;

spring pins connected to each of the first shelf wire ends and second shelf wire ends, each spring pin having a central lumen with a longitudinally extending opening, the spring pin receiving the received wire ends in the central lumen, each central lumen having an unexpanded diameter which is smaller than an outer diameter of the received wire end, such that each spring pin receives the received wire end by expansion to place a radial compressive force on the corresponding wire end;

at least four support legs spaced from each other, each of the support legs having a first leg end and a second leg end, each of the first leg ends extending in a parallel relationship in the first shelf plane, each of the second leg ends extending in a parallel relationship in the second shelf plane, each of the first leg ends received in the central lumen of one of the spring pins, each first leg end having an outer diameter which is larger than the unexpanded diameter of the central lumen of the corresponding spring pin such that spring pin receives the received first leg end by expansion to place a radial compressive force on the received first leg end, each of the second leg ends received in the central lumen of one of the spring pins, each second leg end having an outer diameter which is larger than the unexpanded diameter of the central lumen of the corresponding spring pin such that spring pin receives the received second leg end by expansion to place a radial compressive force on the received second leg end;

wherein the spring pins provide a friction force preventing free movement of the connected support legs with respect to the first shelf surface and the second shelf surface but allowing forced movement of the connected support legs with respect to the first shelf surface and the second shelf surface, thereby allowing the rack to fold between an upright position and a knock down position.

13. The rack of claim 12, wherein each of the first shelf and the second shelf include a plurality of inside wires and a plurality of outside wires connected together by a plurality of crossbars, wherein the outside wires have a distance therebetween defining a width of the shelves, wherein the support legs are on opposing sides of the width of the shelves and are separated by a distance greater than the width of the shelves, and wherein each spring pin runs from one of the inside wires to one of the support legs.

14. The rack of claim 13, wherein the outside wires have a length, wherein the support legs are on opposing ends of the length of the outside wires and are separated by a distance greater than the length of the outside wires.

15. The rack of claim 12, wherein each of the first shelf and the second shelf include a plurality of first wires connected together by a plurality of crossbars, wherein the first wires have ends which extend beyond the crossbars, wherein each hinge runs from the end of one of the first wires to one of the support legs, each of the ends including a bend and each of the support legs including a bend such that each of the spring pins run parallel to the crossbars.

* * * * *